Patented Nov. 2, 1948

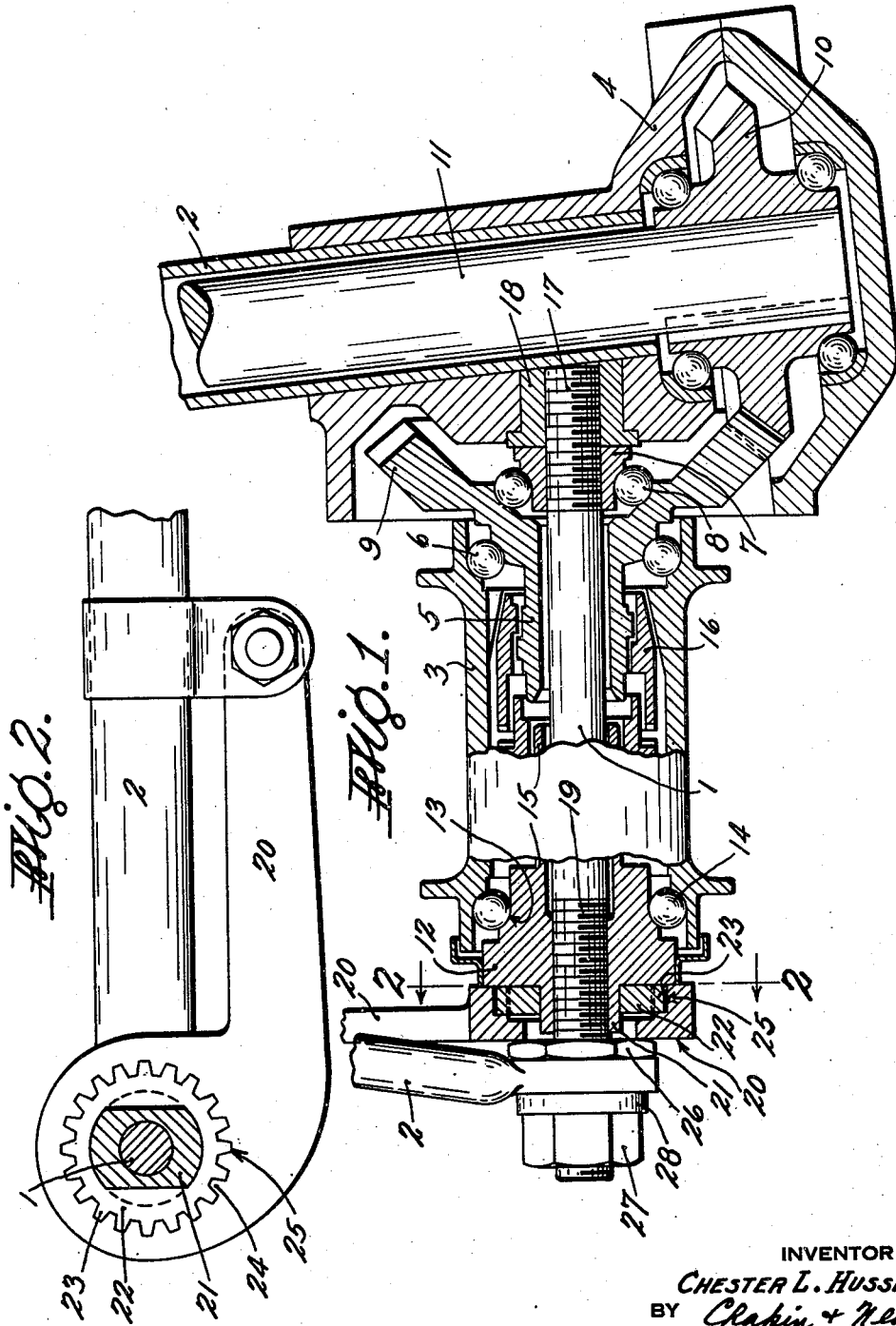

2,452,660

UNITED STATES PATENT OFFICE 2,452,660

CONE BEARING ADJUSTMENT FOR GEAR-DRIVEN COASTER BRAKE

Chester L. Hussey, Belchertown, Mass., assignor to Savage Arms Corporation, Utica, N. Y., a corporation of Delaware Application October 8, 1945, Serial No. 621,097

2 Claims. (Cl. 192—6)

This invention relates to an improvement in coaster brakes for bicycles and has reference in particular to means for adjusting the bearings in a gear drive type of such coaster brake. The general construction and operation of a coaster brake is well understood and may be seen in the prior U. S. Patents #850,077 and #2,181,424.

In the gear drive type of coaster brake for the so-called chainless bicycle it is important to establish a precise relation between the bevel driving gears to insure proper mesh and it is equally important not to upset this relationship when effecting the tightening or loosening adjustments of the ball bearings.

In the present improvement I accomplish the foregoing by permanently fixing the end thrust cone bearing at the drive end of the axle and providing for all necessary adjustments of the bearings by a change of position of the cone thrust bearing at the other or brake end of the axle. Furthermore, in order to provide for a desirable refinement in this adjustment I have devised improved lock connecting means for the brake end cone bearing whereby the same may be adjusted on the axle by increments of as small as .00208.

Further objects and advantages of my invention will become apparent from following more detailed description taken in connection with the accompanying drawings, in which:

Fig. 1 is a view chiefly in horizontal section of the rear end of a bicycle taken through the axle and wheel hub assembly;

Fig. 2 is a side view of the anchor arm as seen from section at line 2—2 of Fig. 1.

Referring more particularly to the drawings, the rear axle 1 is held stationary in the usual manner between the rear forks of a bicycle frame, part of which is indicated at 2. The rear wheel hub is indicated at 3 and the gear casing for the bevel driving gears is shown at 4. It will be understood that this gear casing is supported from the frame of the bicycle in the manner indicated in my previous U. S. Patent #2,378,364.

The coaster brake and hub assembly comprises the usual driver sleeve 5 rotatably supported in the hub by ball bearings 6 and on end thrust cone bearing 7 by ball bearings 8. In the present embodiment this driver sleeve 5 is made integral with the bevel driver gear 9 which meshes with the usual rear end bevel gear 10 on the driving shaft 11 of the bicycle.

At the left hand end of the hub assembly as viewed in Fig. 1 is the usual brake anchor block 12, which is combined with an end thrust cone bearing 13 for the ball bearing 14 at this end of the hub. This anchor block is also preferably made integral with sleeve 15 extended interiorly of the hub for supporting stationary braking elements (not shown). As in the customary brake construction there will be a series of brake discs on the sleeve alternating with brake discs carried on the hub and it is not deemed necessary to show said discs. Screw threaded on the driver sleeve 5 for a shiftable movement is the usual connector 16 which serves to selectively clutch the driver sleeve to the hub 3 or to put into action the braking elements between sleeve 15 and said hub 3, all in the manner well understood.

To accurately position the driver gear 9 with respect to bevel gear 10, I have welded or otherwise fixed the end thrust cone bearing 7 to this end of the axle 1. The projecting portion 17 of said axle is screw threaded into an insert socket 18 welded into the gear casing 4, which socket serves as an abutment for the cone bearing 7 in definitely locating the same. At the other end of said axle 1, the brake anchor block 12 with its cone bearing 13 has a screw threaded engagement as at 19 for rotation of the axle in adjusting the tightness or looseness of the three sets of bearings 14, 6 and 8. A usual and standard pitch for screw threaded parts in bicycles is 24 to the inch and this is the pitch chosen for the screw thread 19, whereby a complete rotation of said anchor block and cone bearing 13 on said axle will produce a lengthwise adjustment of 1/24". In the gear type drive, however, it is often desirable to obtain a closer adjustment for said bearings than said 1/24", and for this purpose I have provided a special locking device for the outer end of said anchor block 12 whereby this greater precision of adjustment may be obtained.

As shown in Fig. 2 the usual anchor arm 20 secured to the frame 2 is provided to hold the anchor block 12 against rotation. The outer side of said anchor block 12 is formed with an extension 21 having flat sides as shown and 22 is a repositioning member or washer which has a flat sided interior orifice fitting on extension 21. The periphery or circumferential portion of said washer is formed with a circular series of uniformly spaced detents or teeth 23 (viz. twenty in the present embodiment) which are adapted for changeable interlocking fit with internal complementary teeth 24 formed in a recess or opening 25 of the anchor arm 20. It is obvious that this multiphase type of adjustable detent interlocking device may assume many equivalent forms.

From this construction it will be readily apparent that the anchor block 12 and its cone bearing 13 may be adjustably locked on the axle 1 by increments of adjustment corresponding to the angular distance between adjacent teeth 23 of washer 22. Since in the present embodiment there are twenty of said teeth 23, this means that an angular adjustment of said anchor block may be made as small as 1/20 of the circumference, viz. 18°. Thus the lengthwise adjustment of the cone bearing 13 on axle 1 effected by one complete turn of anchor block 12 viz. 2¼" can be divided into twentieths for making adjustments as small as 1/480 or .00208". It is obvious, therefore, that the several adjustments of said cone bearing 13 can be accomplished corresponding to a wide variety of angular increments in the repositioning of the washer 22 throughout 360° of arc, viz. between 18° and any multiple thereof. Furthermore such bearing adjustments are made without disturbance to the relationship of the bevel gears 9 and 10 as determined by the permanently fixed cone bearing 7.

A clamp nut 26 is threaded on axle 1 as shown to clamp the anchor arm 20 and its toothed washer 22 against the anchor block 12 and the usual axle nut 27 and washer 28 are employed to screw the frame fork member 2 against said nut 26.

The operation of adjusting the bearings consists in loosening nuts 27 and 26 so as to laterally withdraw the anchor arm 20 from engagement with the teeth 23 of washer 22. Thereupon the anchor block 12 with its cone bearing 13 is adjustably turned on the axle either by wrench applied to the flatted extension 21 or by the tapping of a screw driver against the teeth of washer 22 until the desired adjustment is completed whereupon the anchor arm is reengaged into the locking device of toothed washer 22 and the parts are clamped together as shown in Fig. 1.

I claim:

1. In a coaster brake for bicycles of the gear drive type wherein the axle is stationary in the frame, and the wheel hub assembly comprises a driver sleeve with inner and outer ball bearings and a drive end cone member on the axle, together with a combined brake anchor cone member for a ball bearing at the brake end of said hub, together with an anchor arm secured to the frame to hold said brake anchor and cone member against rotation, the combination therewith of means rigidly fixing the drive end cone member to the axle, said brake anchor and cone member being threaded on said axle for rotatable adjustment thereon in adjusting the bearings between said cone members, and means for locking the rotatable adjustment of said brake anchor and cone member in a wide variety of angular increments within 360° of arc comprising a repositioning member carried by said brake anchor and cone member and multiple detent interlocking means between said repositioning member and anchor arm.

2. In a coaster brake for bicycles of the type wherein the axle is stationary in the frame, and the wheel hub assembly comprises a driver sleeve with inner and outer ball bearings and a drive end cone member on the axle, a combined brake anchor and cone member for a ball bearing at the brake end of said hub, together with an anchor arm secured to the frame to hold said brake anchor and cone member against rotation, the combination therewith of means rigidly fixing the drive end cone member to the axle, said brake anchor and cone member being threaded on said axle for rotatable adjustment thereon in adjusting the bearings between said cone members, and means for locking the rotatable adjustment of said brake anchor and cone member in relatively small angular increments comprising a washer having a flat sided orifice fitted upon a flat sided extension of said brake anchor and cone member, said washer having a plurality of circumferentially disposed teeth adjustably engaged with complementary teeth formed in a recess of said anchor arm.

CHESTER L. HUSSEY.

REFERENCES CITED

The following references are of record in the file of this patent:

UNITED STATES PATENTS

| Number | Name | Date |
|---|---|---|
| 1,356,052 | Duchesne | Oct. 19, 1920 |
| 1,667,924 | Boutin | May 1, 1928 |
| 1,911,461 | Musselman | May 30, 1933 |
| 2,087,657 | Schmidt | July 20, 1937 |